UNITED STATES PATENT OFFICE.

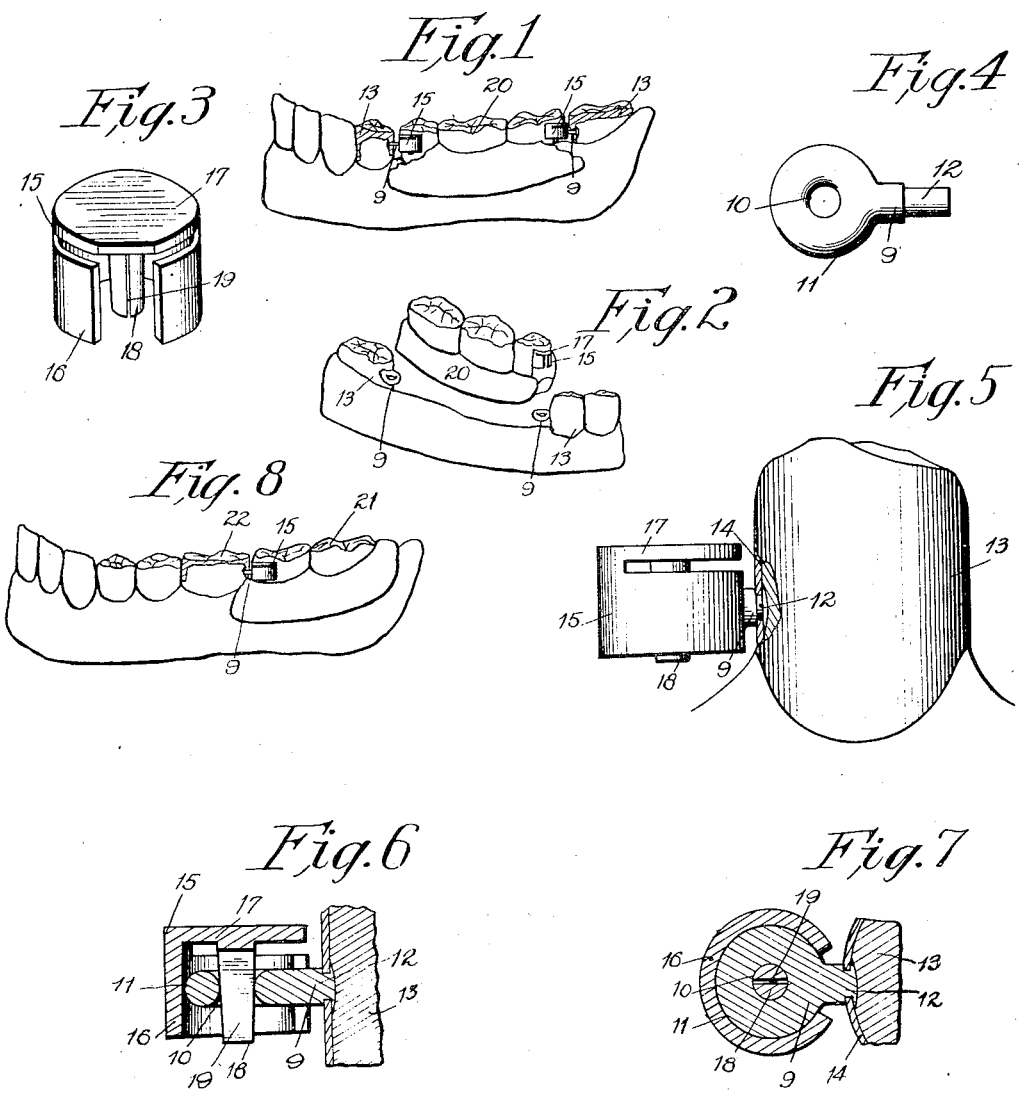

BARNABAS FREDERICK PHILBROOK, OF DENISON, IOWA.

REMOVABLE ARTIFICIAL DENTURE.

1,199,109.  Specification of Letters Patent.   Patented Sept. 26, 1916.

Application filed November 12, 1915.  Serial No. 61,000.

*To all whom it may concern:*

Be it known that I, BARNABAS FREDERICK PHILBROOK, a citizen of the United States, residing at Denison, in the county of Crawford and State of Iowa, have invented a certain new and useful Improvement in Removable Artificial Dentures, of which the following is a full, clear, concise, and exact description, reference being had to the accompanying drawings, forming a part of this specification.

My invention relates to removable artificial dentures such as bridges, crowns, etc., and more particularly to devices for connecting the artificial dentures to the natural teeth or the roots thereof, as the case may be.

The object of the invention is to provide means for connecting the artificial denture to the stationary tooth in such a way that the artificial denture cannot accidentally be separated or loosened from the tooth, but can readily be removed if the wearer so desires, and for connecting the artificial denture to the tooth in a manner such as to permit relative movement between the denture and the stationary tooth during the process of mastication so that the denture may yield slightly either one way or the other, as the case may be, when pressure is exerted upon it.

To carry out these objects I provide a separable connection which comprises two members, one of the members being carried by the stationary tooth and the other member by the artificial denture. The members are arranged to coöperate with each other so as to form a universal joint. In devices of the past which contained this universal joint connection and a connection which could be readily separated the points of contact between the two members formed but a single line. Since, therefore, in such devices there is only a single line contact between the two members forming the universal joint the wearing surfaces of the contact will after use become worn and produce a loose connection which may allow accidental separation of the denture from the stationary tooth. In the denture of my invention I double the contacting or wearing surfaces between the two members constituting the joint without enlarging the members and still maintain the joint connection to enable the artificial denture to move relative to the stationary tooth. The points of connection between the members in my device constitute two lines which are disposed in substantially the same horizontal plane to permit one member to move relative to the other, as will be hereinafter pointed out.

My invention will be more clearly understood by reference to the accompanying drawings in which, Figure 1 is a side elevational view of an artificial denture secured to the stationary teeth by means of the connection of my invention. Fig. 2 is a perspective view of the same showing the artificial denture removed from the stationary teeth. Fig. 3 is a perspective view of the split cup member which is arranged to be carried by the artificial denture. Fig. 4 is a top view of the eye which coöperates with the cup illustrated in Fig. 3 and is arranged to be carried by the stationary tooth or part thereof. Fig. 5 is a side elevational view of a stationary tooth and the connector of my invention mounted thereon. Fig. 6 is a view similar to Fig. 5 showing the connector, or universal joint, in section. Fig. 7 is a horizontal sectional view of Fig. 6, and Fig. 8 is a view similar to Fig. 1 showing only one connection between the artificial denture and the stationary tooth.

Similar characters of reference refer to similar parts throughout the several views.

The universal connection of my invention comprises an eye 9 illustrated in Fig. 4. This eye has a rounded inner wall 10 and a rounded outer wall 11, the purpose of which will be presently described. An extension 12 is provided to facilitate a connection of the eye with a stationary tooth. In Figs. 5 and 7 I have illustrated a stationary tooth 13 provided with a crown 14 to which is soldered, or otherwise secured, the eye 9. The eye is secured to the stationary tooth in a manner so as to have the axis of the opening contained therein a substantially vertical plane. The other member of the universal joint comprises a cup 15 which has a downwardly extending split ring 16 carried by the base 17 of the cup. As illustrated in the drawings the ring 16 has the greater part of its upper edge separated from the base 17 so that it is allowed to expand or contract when the eye is inserted, as will be pointed out hereinafter. The base 17 has a centrally located downwardly extending stud 18, the stud being tapered downwardly, as illustrated, and slotted at 19 to permit the legs forming the stud to move toward each other.

As illustrated in Fig. 1, a cup 15 is provided at each end of the artificial denture 20. These cups may be cemented to the denture or secured to the same in any other suitable manner. An eye 9 is provided for each of the cups 15 and may be held in an abutment tooth crown 13 disposed immediately adjacent the cup. The connection between the eye 9 and cup 15 is clearly illustrated in Figs. 6 and 7. The split stud 18 extends down into the eye 9 and engages the inner rounded wall 10. The inner surface of the split ring 16 engages the rounded surface 11 of the eye, thus tightly holding the members together. In separating or moving the artificial denture from the stationary tooth the denture is moved upwardly, as illustrated in Fig. 2, away from the eyes 9.

When the members comprising the universal joint are connected, as illustrated in Fig. 6, the points of connection between the downwardly extending stud 18 and the inner wall 10 of the eye 9 assume a straight line disposed in a substantially horizontal plane. The same is true of the points of connection between the inner wall of the split ring 16 and the outer wall 11 of the eye 9. Since the ring 16 is split and is normally of smaller diameter than the eye 9 the ring 16 will be forced outwardly against the spring tension of the ring, which tension will cause the inner wall of the ring 16 to tightly engage the outer wall 11 of the eye. The stud 18 is tapered, as before stated, so that when it is inserted into the eye the legs thereof will be forced toward each other and thus produce tight frictional engagement between the stud and the inner wall 10 of the eye. I obtain, therefore, by means of this construction a connection whose surface is substantially twice as great as the surface of connections of this class which have been employed in the past and which are of substantially the same size as the connector here illustrated. Attention is called to the fact that the lines of engagement between the inner wall 10 and stud 18 and the outer wall 11 and ring 16 are disposed in a substantially horizontal plane so that the cup member 15 may revolve slightly relative to the eye to permit the necessary adjustment of the artificial denture during mastication.

In Fig. 8 I have illustrated the artificial denture 21 connected to the artificial tooth 22 by means of only one connector instead of employing a connector at each end of the denture as illustrated in Figs. 1 and 2.

Having thus described my invention, what I claim as new and desire to secure by United States Letters Patent is:

1. In a removable artificial denture structure the combination with a stationary tooth or part thereof, of an artificial denture an eye carried by one of the members, a ring carried by the other member, adapted to embrace the eye, and a stud provided in the ring arranged to extend through the eye to engage the inner wall thereof, the lines of connections between the ring and eye and between the stud and eye, forming two lines lying in a single plane substantially perpendicular to the axis of the stud whereby the eye and ring may have universal movement relative to each other.

2. Automatically adjusting means for removably securing artificial denture to a stationary tooth comprising, an eye having rounded inner and outer walls, a ring arranged to embrace the outer wall of the eye, and a stud carried by the ring arranged to extend through the eye to engage the inner wall thereof.

3. Automatically adjusting means for removably securing artificial denture to a stationary tooth comprising, an eye having rounded inner and outer walls, a split ring arranged to embrace the outer wall of the eye, and a stud carried by the ring arranged to extend through the eye to engage the inner wall thereof.

4. Automatically adjusting means for removably securing artificial denture to a stationary tooth comprising, an eye having rounded inner and outer walls, a split ring arranged to embrace the outer wall of the eye, and a split stud carried by the ring arranged to extend through the eye to engage the inner wall thereof.

5. In a removable artificial denture structure the combination with a stationary tooth, of an artificial denture, a first member carried by the stationary tooth and a second member carried by the artificial denture, each member having male and female connections with the other member to frictionally hold the artificial denture to the stationary tooth, the lines of connections between the members forming two lines lying in a single plane substantially perpendicular to the axis of the members, whereby the members may have universal movement relative to each other.

6. In a removable artificial denture structure the combination with a stationary tooth or part thereof, of an artificial denture, an eye secured to the stationary tooth, said eye having rounded inner and outer walls, a cup carried by the artificial denture comprising a base, a split spring ring carried by the base arranged to embrace the outer wall of the eye, and a centrally located stud protruding from the base and arranged to extend through the eye to engage the inner wall thereof.

7. In a removable artificial denture structure the combination with a stationary tooth or part thereof, of an artificial denture, an eye secured to the stationary tooth, said eye having rounded inner and outer walls, a cup carried by the artificial denture comprising a base, a split spring ring carried by the base arranged to embrace the outer wall of the eye, and a centrally located split spring stud protruding from the base arranged to extend through the eye to engage the inner wall thereof.

8. Means for removably securing artificial denture to a stationary tooth comprising an eye secured to one of the members, a yieldable ring carried by the other member arranged to embrace the outer wall of the eye, and a stud carried by the ring arranged to extend through the eye to engage the inner wall thereof, the lines of connections between the ring and the eye and between the stud and the eye forming two lines lying in a single plane substantially perpendicular to the axis of the stud, whereby the eye and ring may have universal movement relative to each other.

9. Means for removably securing artificial denture to a stationary tooth comprising an eye secured to one of the members, a yieldable ring carried by the other member, arranged to embrace the outer wall of the eye, and a yieldable stud carried by the ring and arranged to extend through the eye to engage the inner wall thereof, the lines of connections between the ring and eye and between the stud and eye forming two lines lying in a single plane substantially perpendicular to the axis of the stud, whereby the eye and ring may have universal movement relative to each other.

In witness whereof, I hereunto subscribe my name this 4th day of November A. D. 1915.

BARNABAS FREDERICK PHILBROOK.

Witnesses:
L. C. KEMMING,
A. B. LORENZEN.